(12) United States Patent
Wendt et al.

(10) Patent No.: US 6,464,062 B1
(45) Date of Patent: Oct. 15, 2002

(54) COOLING BED ROLLER INSERTS

(76) Inventors: Bernard J. Wendt, 5919 Morning Dr., Davisburg, MI (US) 48350; G. Rae Alton, 8 Varsity Avenue, Saulte Ste. Marie, Ontario (CA), P6A 5T8

( * ) Notice: Subject to any disclaimer, the term of this patent is extended or adjusted under 35 U.S.C. 154(b) by 0 days.

(21) Appl. No.: 09/892,828

(22) Filed: Jun. 27, 2001

(51) Int. Cl.⁷ .............................................. B65G 13/00

(52) U.S. Cl. ...................................... 193/35 R; 193/37

(58) Field of Search .................................. 193/35 R, 37

(56) References Cited

U.S. PATENT DOCUMENTS

| | | | |
|---|---|---|---|
| 3,915,275 A | * 10/1975 | Specht | .................. 193/35 R |
| 5,265,711 A | 11/1993 | Plesh, Sr. | |
| 5,301,785 A | 4/1994 | Plesh, Sr. | |
| 5,472,179 A | 12/1995 | Wendt et al. | |
| 5,908,102 A | 6/1999 | Plesh, Sr. | |
| 5,921,370 A | 7/1999 | Plesh, Sr. | |

OTHER PUBLICATIONS

DEVA Metal Plain Bearings, Application Data Sheet 76.26–01.012, Glacier GMBH.

* cited by examiner

*Primary Examiner*—Joseph E. Valenza
(74) *Attorney, Agent, or Firm*—Brooks & Kushman P.C.

(57) ABSTRACT

A roller insert assembly is installed within a cooling bed plate including a plurality of spaced apart longitudinal members and a plurality of spaced apart transverse members which collectively define an array of pockets therebetween. The assembly includes a roller pivotal about a roller axis. An axle cooperates with the roller and is coaxially aligned with the roller axis. The axle has two end portions located at opposed axial ends of the roller. The assembly also includes a pair of bearing supports sized to fit within a pair of transversely aligned U-shaped cut-out notches. The U-shaped notches are formed in a pair of spaced apart longitudinal members. A bearing is mounted within each bearing support for pivotally engaging the axle end portions. The roller insert assembly is designed to orient an upper portion of the roller at a select height above the cooling bed plate to provide rolling support to a heated planar object positioned thereon during cooling.

22 Claims, 4 Drawing Sheets

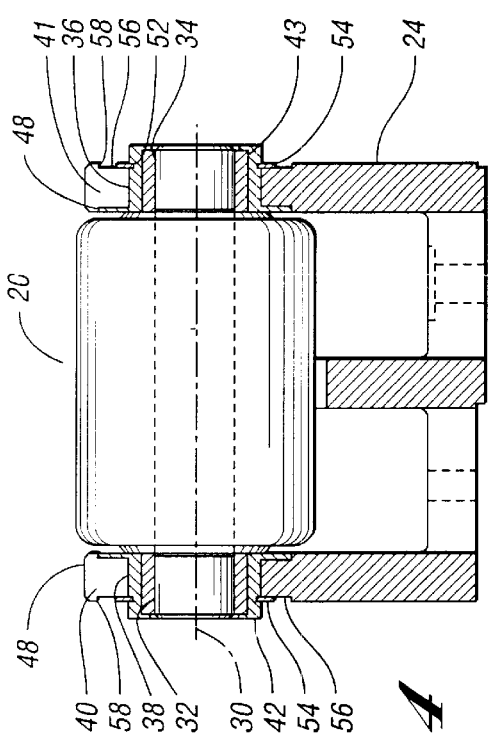
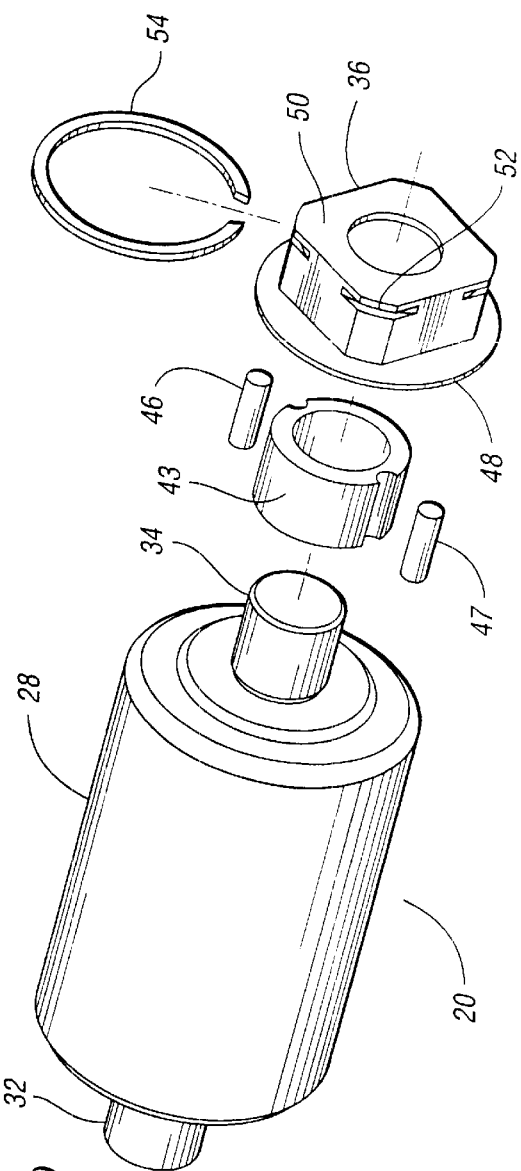
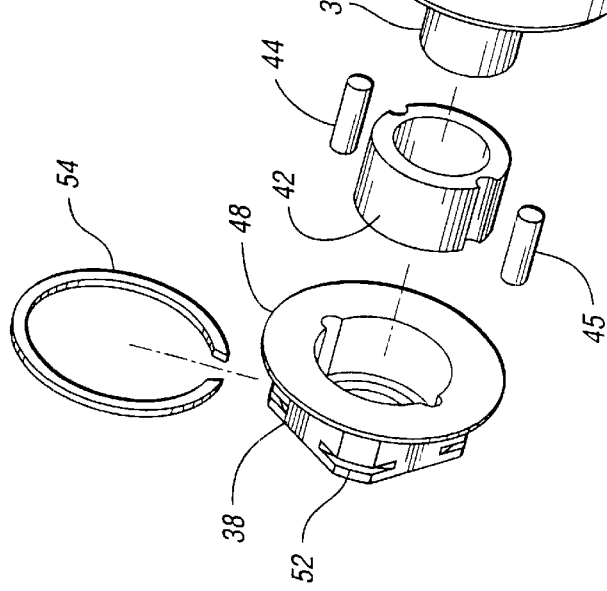
Fig. 4
Fig. 5

COOLING BED ROLLER INSERTS

BACKGROUND OF THE INVENTION

1. Field of the Invention

The present invention relates to cooling beds and particularly to cooling bed plates having a roller insert for supporting a heated object during cooling.

2. Background Art

Cooling bed plates are typically used in foundries and steel mills for supporting large, heavy billets or castings as they cool. Historically, cooling bed plates were large, heavy grids made up of a series of longitudinal rail members with interconnecting transverse members providing structure. Large billets to be cooled were placed on the cooling bed plates. In order to move the billets, they would either have to be lifted or skid across the grid surface.

There have been numerous efforts over the years to provide cooling bed plates with rollers so that objects can be transferred across an aligned series of cooling bed plates. The manufacturing of cooling bed plates having rollers is not a simple nor easy task. The roller assemblies must be capable of withstanding high loads and high temperatures in a steel mill. It is not uncommon to place steel billets on a cooling bed plate while the steel is in the 1400° F. range. These high temperatures cause corrosion and lubrication problems for the rollers and associated bearings. When the cooling bed plate is used to support ferrous materials such as steel, it is common to lift the cooled steel billets off of the cooling bed plate using a magnetic crane. The rollers, if formed of a magnetic material, tend to lift with the magnet necessitating that the rollers be physically constrained in a vertical direction.

Suppliers in the past have manufactured roller insert assemblies for use in retro fitting cooling bed plates not initially provided with rollers. These systems tend to be complex, cumbersome and are susceptible to heat induced corrosion. It is an object of the present invention to provide a simple, reliable, low cost roller insert for cooling bed plates.

SUMMARY OF THE INVENTION

The cooling bed plate for use with the present invention is made up of a series of spaced apart longitudinal members, and a plurality of spaced apart transverse members which collectively define an array of pockets. A plurality of roller assemblies are installed in a cooling bed plate. Each roller assembly includes at least one roller which is pivotal about an axis, an axle cooperating with the roller provided with two end portions located opposite axial ends of the roller and a pair of bearing supports sized to fit within a pair of transversely aligned U-shaped cut out notches formed in a pair of spaced apart longitudinal members. A bearing is mounted within each of the bearing supports for pivotally receiving an axle end portion. The bearings are oriented at a height relative to the longitudinal members to orient the upper surface of the roller at a selected height above the cooling bed plate in order to provide rolling support for a heated, generally planar object positioned thereunder during cooling. Preferably, the bearings and bearing supports each contain a plurality of corresponding radial slots fitted with roll pins, to prevent rotation of the bearings within the bearing supports. Preferably, the bearings are made of a graphite material capable of withstanding the high heat and load experienced in a cooling bed plate environment. Ideally, the roller assembly will also include a retainer for vertically retaining the bearing supports within the U-shaped cut-out notches formed in the longitudinal members.

BRIEF DESCRIPTION OF THE DRAWINGS

FIG. 4 is a longitudinal partially cut away side elevational view of the assembly of FIG. 2;

FIG. 5 is an exploded perspective view of the roller insert assembly;

DETAILED DESCRIPTION OF THE PREFERRED EMBODIMENT(S)

Figure 1:
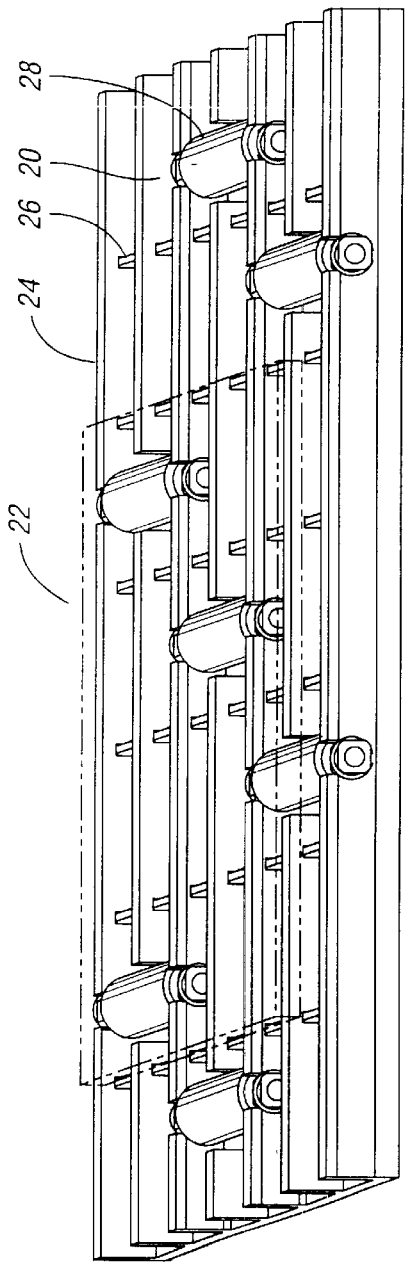
FIG. 1 is a perspective view of a cooling bed plate provided with a series of roller insert assemblies, for supporting a heated object, positioned thereunder during cooling.
Figure 3:
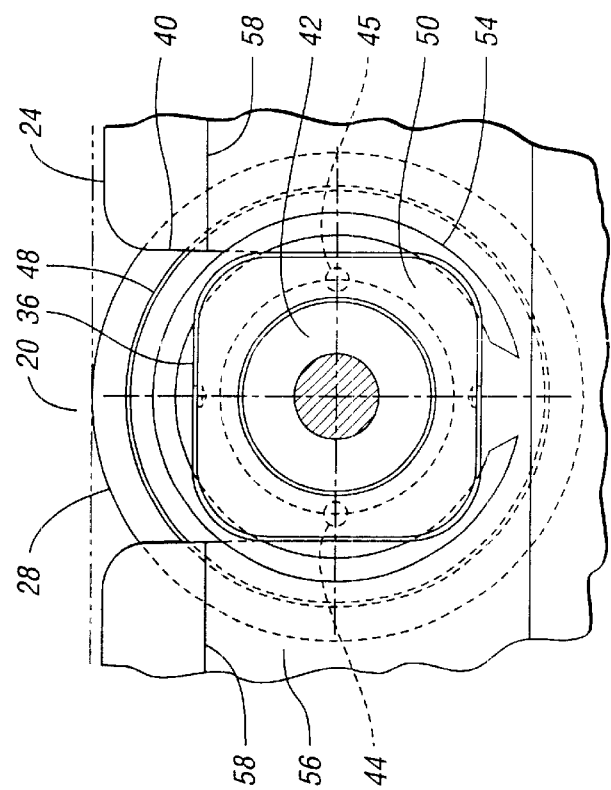
FIG. 3 is an axial end view of the roller insert assembly of FIG. 2.
Figure 2:
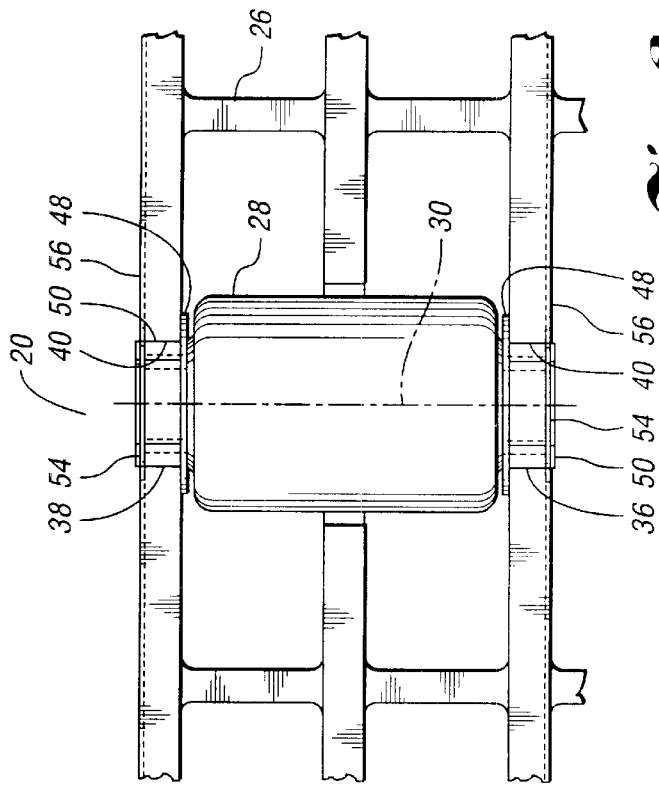
FIG. 2 is an enlarged plan view of a roller insert assembly and adjacent cooling bed plate portion.

A roller insert assembly 20, in FIG. 1, is installed in a cooling bed plate 22 as illustrated. Typically, a single cooling bed plate 22 will have a series of roller insert assemblies 20 spaced in a staggered array across the upper generally horizontal surface of cooling bed plate 22. Cooling bed plate 22 is made up of a plurality of members formed together to create a grid. Longitudinal members 24 are attached to one another by a series of transverse members 26 which collectively form rectangular pockets therebetween. In the first embodiment of the invention, as illustrated in FIGS. 1–5, a portion of longitudinal member intermediate longitudinal members 24 in which a roller insert assembly 20 is supported, is removed, as illustrated in FIG. 2, to provide a double-wide pocket sized to receive an elongated roller 28.

Roller 28 is pivotal about a roller axis 30 which is generally horizontal and parallel to the top surface of cooling bed plate 22. Roller 28 cooperates with an axle which is coaxially aligned with roller axis 30. The axle embodiment illustrated is formed by two axle end portions 32 and 34 created on opposite axial ends of roller 28. In the embodiment illustrated, roller 28 and the axle are integrally formed. Alternatively, the axle could be a separate shaft which extends through an axial bore in roller 28 as illustrated in dotted outline in FIG. 4. Axle end portions 32 and 34 are pivotally mounted to longitudinal members 24 by a pair of bearing supports 36 and 38.

Bearing supports 36 and 38 are sized to fit within a pair of transversely aligned cut out notches 40 and 41 formed in a pair of spaced apart longitudinal members 24. Preferably, U-shaped notches 40 and 41 will have a pair of generally vertical flanges which cooperate with flats formed on bearing supports 36 and 38, in order to prevent relative rotation of bearing supports 36 and 38 in longitudinal members 24.

The depth of the U-shaped notches 40 and 41 is determined by the roller diameter and the size of bearing supports 36 and 38 so that the upper most surface of roller 28 is positioned at a selected height relative to the top planar surface of cooling bed plate 22. Therefore, an object placed on cooling bed plate 22 will be supported by a plurality of rollers 28.

In order to provide a highly durable roller insert assembly 20, which can withstand the high loads and temperatures necessary for this cooling bed plate application, a pair of bearings 42 and 43 will be mounted in bearing supports 36 and 38 for pivotally cooperating with axle end portions 32 and 34. In the preferred embodiment illustrated, bearing supports 36 and 38 have radial slots formed within the inside diameters. Bearings 42 and 43 have corresponding radial slots formed within the outside diameters. Roll pins 44, 45, 46 and 47 fit into the radial slots of bearing supports 36 and 38 and the radial slots of bearings 42 and 43, preventing bearings 42 and 43 from rotating in bearing supports 36 and 38.

In the preferred embodiment illustrated, bearings 42 and 43 are formed of graphite and more particularly, a graphite graded XG 4000 which is available and typically used for making electric motor brushes. While this material is quite satisfactory for this application, other non-ferrous bearing materials will be suitable, provided they meet the abrasion resistance and temperature limitations necessary for the selected application. Alternatively, bronze or other more traditional bearing materials may be used to practice the present invention. In order to maximize bearing life, axle end portions 32 and 34 are preferably machined to a finish having a maximum roughness of sixteen micro inches. Most preferably, the axle end portions 32 and 34 will be machined to a finish having a roughness less than twelve micro inches.

In the preferred embodiment, roller 28 and axle end portions 32 and 34 are integrally machined from a unitary section of H13, a heat resistant tool steel. Bearing supports 36 and 38 are formed of SAE 1018, a low carbon steel. Of course, other materials can be utilized for roller 28 and bearing supports 36 and 38, if the materials provide adequate corrosion resistance and machinability. Preferably, bearings 42 and 43 will be formed of a moldable graphite material, so that minimal machining will be required to achieve the bearing finished dimensions.

Bearing supports 36 and 38 are positioned relative to longitudinal members 24 by a flange 48 formed on the inboard side of bearing supports 36 and 38 adjacent to roller 28. Flange 48 is larger than U-shaped notch 40, thereby preventing bearing supports 36 and 38 from moving axially outward and becoming dislodged from longitudinal members 24. Ideally, the cooperating inner surface of longitudinal members 24 will be machined flat if the inner surface of longitudinal members 24 is irregular.

Bearing supports 36 and 38 have an axial length which exceeds the thickness of longitudinal members 24, enabling the end portion of the bearing supports 36 and 38 to project outboard beyond the longitudinal members 24. The bearing support end portion 50 in the embodiment shown in FIGS. 2–5 is provided with a recessed radial groove 52 which lies in a plane normal to roller axis 30. Bearing supports 36 and 38 are retained within U-shaped notches 40 by retainer rings 54 which is sized to partially fit within groove 52. A portion of rings 54 extends outboard of bearing support 36 as illustrated to cooperate with the outboard surface of longitudinal members 24. The outboard surface of longitudinal members 24 is machined to form recessed faces 56 perpendicular to the roller axis on opposite sides of U-shaped notches 40. Recessed faces 56 forms a stepped corner 58 which cooperates with rings 54 to prevent bearing supports 36 and 38 from being raised vertically out of U-shaped notches 40.

Retainer rings 54 is generally illustrated as C-shaped and commonly referred to as a snap ring or spring clip. In this application, however, due to the high temperatures experienced by rings 54, it will typically become annealed and lose much of its spring-like qualities. Therefore, rings 54 must be selected of a material that will sustain sufficient structure when heated, to retain bearing supports 36 and 38 in place. Alternatively, continuous rings 54 could be utilized and be formed slightly to a non-round state as it is pressed over the bearing support end portion 50 during installation. Retention rings 54, corresponding groove 52 on bearing support 36 and stepped recessed faces 56 on longitudinal members 24, provide a simple, yet secure retention mechanism. This mechanism enables an operator to remove and install roller insert assembly 20 without removing any threaded fasteners which tend to corrode in this hostile environment.

Figure 6:
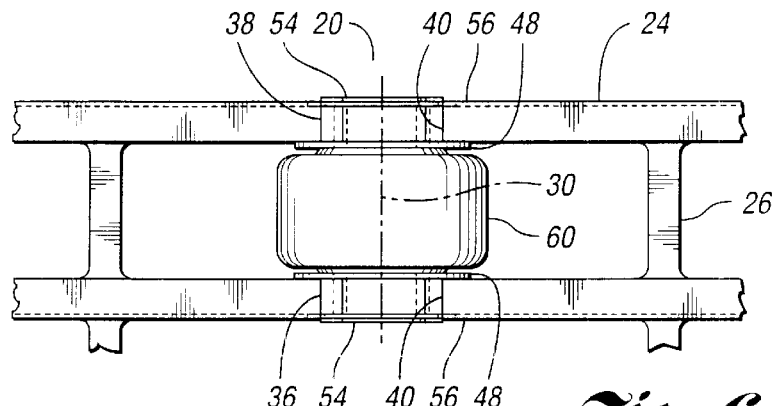
FIG. 6 is a top plan view of an alternative roller insert assembly.

FIG. 6 illustrates an alternative roller 60 which has a reduced axial length in comparison to roller 28 described earlier. Other than the reduced axial length, roller 60 functions identically to roller 28 described previously. Of course, since roller 60 is sized within an individual pocket, it is not necessary to remove a portion of a longitudinal members 24 located between the two spaced apart longitudinal members 24 in which U-shaped notches 40 is formed. Whether one chooses to use short rollers 60 or long rollers 28 is a matter of design choice.

Figure 7:
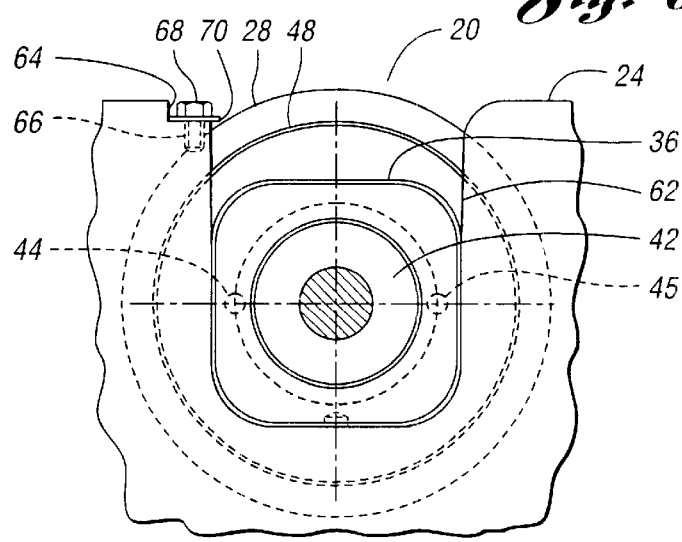
FIG. 7 is an axial end view of a roller insert assembly illustrating a second alternative retainer mechanism.

FIG. 7 illustrates a second alternative mechanism for retaining bearing support s36 and 38 within U-shaped notches 62. The upper corner of one of U-shaped notches 62 is provided with a recess 64 which has a threaded hole 66 formed therein. A threaded fastener 68 with a large head, as illustrated, is removably mounted within threaded hole 66 to create a positive stop limiting bearing support 36 within the U-shaped notches 62. Preferably, an annular disc such as a heavy washer 70, will be mounted under the head of fastener 68 providing a positive stop surface within U-shaped notches 62.

Figure 8:
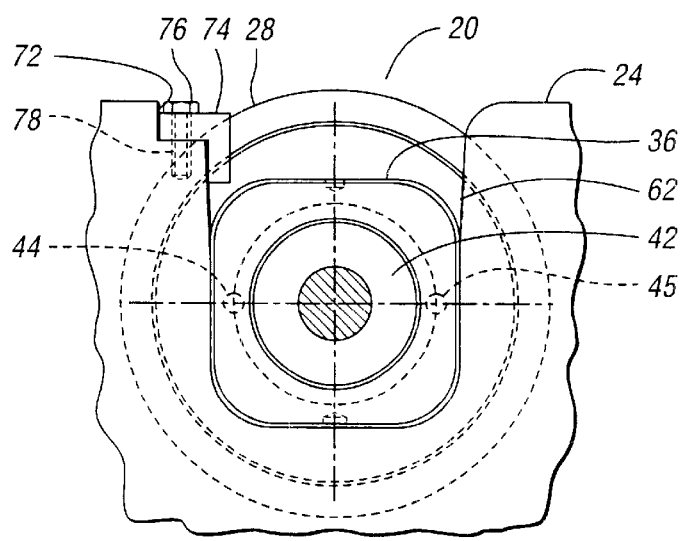
FIG. 8 is an axial end view of a roller insert assembly illustrating a third alternative retainer mechanism.

The embodiment illustrated in FIG. 8 is similar to the embodiment illustrated in FIG. 7 with a positive limiting stop fastened within a recess 72 at the upper corner of one of the U-shaped notches 62. However, recess 72 is larger than the previous embodiment to accommodate the thickness of stop bracket 74 and the height of threaded fastener 76. A threaded hole 78 is formed within recess 72 and the fastener 76 is removably mounted within this threaded hole 78. Positive stop bracket 74 is mounted under the head of threaded fastener 76 providing a positive stop surface which forms a feature projecting within the U-shaped notches 62. The FIG. 7 and FIG. 8 embodiments have a drawback that it is necessary to machine cooling bed plate 22 before roller insert assembly 20 is installed. Threaded fasteners 68 and 76 will be formed of stainless steel or the like to prevent corrosion of the threads resulting in potential difficulties removing roller insert assembly 20.

Figure 9:
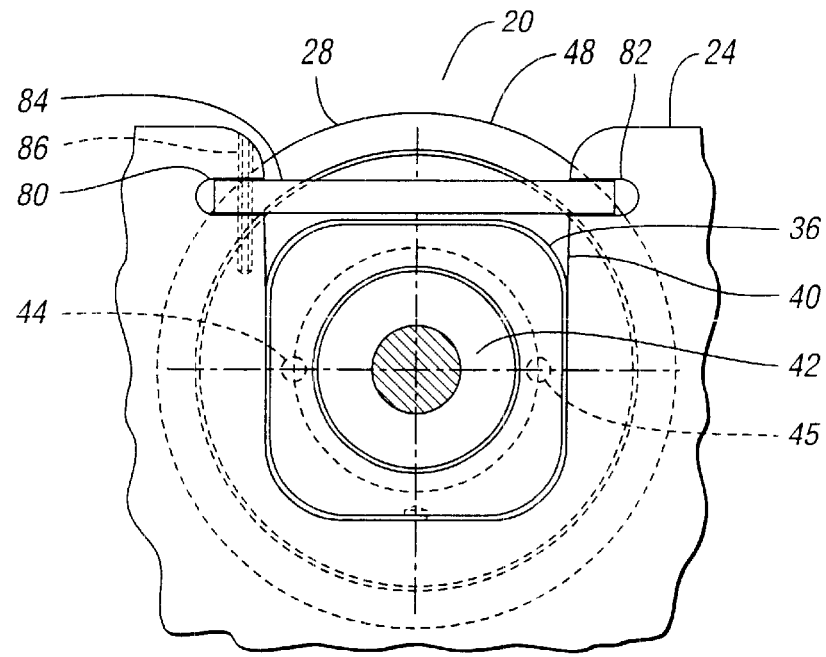
FIG. 9 is an axial end view of a roller insert assembly illustrating a fourth alternative retainer mechanism.
Figure 10:
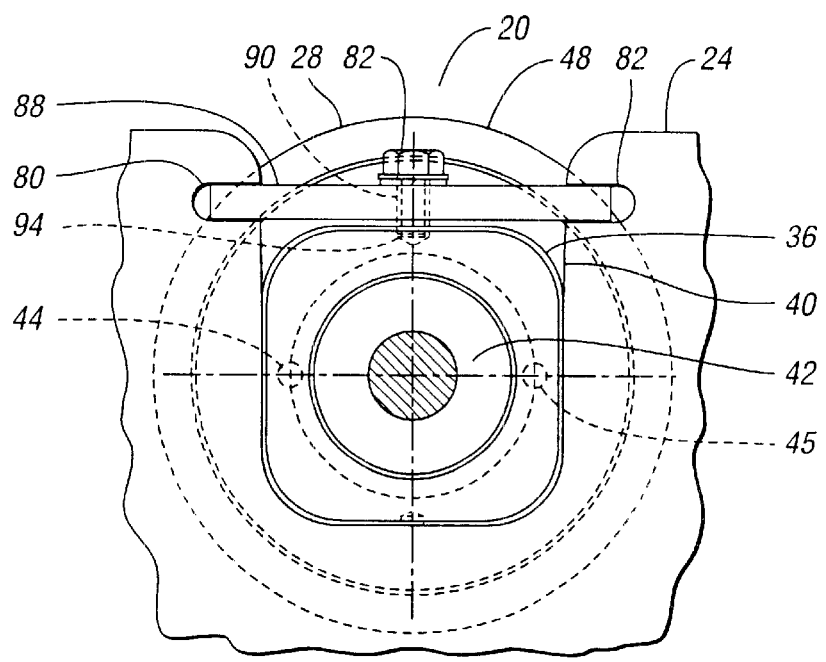
FIG. 10 is an axial end view of a roller insert assembly illustrating a fifth alternative retainer mechanism.

The embodiments illustrated in FIGS. 9 and 10 eliminate the need for threaded holes formed in the longitudinal members 24. Instead, a horizontal slot is machined in longitudinal members 24 extending through U-shaped notches 40 as illustrated in FIGS. 9 and 10. The horizontal slot embodiment is illustrated by two horizontal slot end portions 80 and 82 which are oriented relative to one another in the opposite vertical surfaces of U-shaped notches 40.

Horizontal slot end portions 80 and 82 are sized to receive a horizontal bar 84 for extending across the vertical opening in U-shaped notches 40.

In FIG. 9 embodiment, horizontal bar 84 is hinged at one end in a horizontal slot end portion 80 about a pivot pin 86. Pin 86 is installed vertically in longitudinal members 24 through both edges of a horizontal slot end portion 80 and horizontal bar 84. When horizontal bar 84 is located in the orientation parallel to horizontal slot end portions 80 and 82 in longitudinal members 24 as illustrated, both ends of horizontal bar 84 are engaged in both end portions 80 and 82 of longitudinal members 24, retaining the bearing supports 36 within U-shaped notches 40. Pivot pin 86 enables horizontal bar 84 to be rotated out of U-shaped notches 40, allowing an operator to freely perform maintenance upon roller insert assembly 20.

In the FIG. 10 embodiment, instead of pivot pin 86, horizontal bar 88 is provided with a threaded central hole 90 sized to receive threaded fastener 92 such as a bolt. Fastener 92 has an axial length such that when fastener 92 is tightened into threaded central bore 90 extending through bar 88, the free end of fastener 92 projects downward from bar 88 for pivoting within a pocket 94 machined in the upper surface of bearing supports 36. The end of fastener 92 thereby prevents bar 88 from sliding out of the horizontal slot end portions 80 and 82, and bolt 92 eliminates the need to machine holes in longitudinal members 24 for receiving threaded fasteners or pivot pins.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A roller insert assembly for installation within a cooling bed plate having a plurality of spaced-apart longitudinal members and a plurality of spaced-apart transverse members which collectively define an array of pockets therebetween, the roller insert assembly comprising:
   at least one roller pivotal about a roller axis;
   an axle cooperating with the roller and coaxially aligned with the roller axis, the axle having two end portions located at opposed axial ends of the roller;
   a pair of bearing supports sized to fit within a pair of transversely aligned U-shaped cut-out notches formed in a pair of spaced-apart longitudinal members; and
   a pair of bearings each mounted within one of the pair of bearing supports for pivotally engaging the axle end portions to orient an upper portion of the roller at a select height above the cooling bed plate to provide rolling support to a heated planar object positioned thereon during cooling.

2. The roller insert assembly of claim 1, wherein the roller is cylindrical in shape.

3. The roller insert assembly of claim 1, wherein the roller and axle are integrally formed.

4. The roller insert assembly of claim 1, wherein the axle end portions are finished to a maximum roughness of 16 micro inches.

5. The roller insert assembly of claim 1, wherein the bearing support is provided with a flange, located on an axial end adjacent the roller, sized larger than the width of the U-shaped cut-out notch to limit movement relative to the longitudinal member, the longitudinal member having a face formed thereon perpendicular to the roller axis for cooperating with the flange.

6. The roller insert assembly of claim 1, wherein the U-shaped cut-out notch provides parallel, flat walls and the bearing support has a plurality of parallel flat sides sized to fit in the notch and restrain rotation of the bearing support.

7. The roller insert assembly of claim 1, wherein each bearing has a plurality of radial slots formed into the outer diameter, each bearing support has corresponding radial slots formed into the inner diameter, a plurality of roll pins fit in the corresponding slots preventing the bearing from rotating within the bearing support.

8. The roller insert assembly of claim 1, wherein the bearing is formed of a non-ferrous material resistant to high heat and capable of handling the heavy loads.

9. The roller insert assembly of claim 8, wherein the non-ferrous bearing material comprises graphite.

10. The roller insert assembly of claim 9, wherein the bearing is manufactured using a molding processs.

11. The roller insert assembly of claim 1, wherein the bearing is fixed into the bearing support.

12. The roller insert assembly of claim 1, wherein the overall length of the roller exceeds the width of an individual pocket in the cooling bed and at least one longitudinal member, intermediate to the longitudinal members in which the bearing supports are located provides clearance of the roller.

13. A roller insert assembly for installation within a cooling bed plate having a plurality of spaced-apart longitudinal members and a plurality of spaced-apart transverse members which collectively define an array of pockets therebetween, the roller insert assembly comprising:
   at least one roller pivotal about a roller axis;
   an axle cooperating with the roller and coaxially aligned with the roller axis, the axle having two end portions located at opposed axial ends of the roller;
   a pair of bearing supports sized to fit within a pair of transversely aligned U-shaped cut-out notches formed in a pair of spaced-apart longitudinal members;
   a pair of bearings each mounted within one of the pair of bearing supports for pivotally engaging the axle end portions to orient an upper portion of the roller at a select height above the cooling bed plate to provide rolling support to a heated planar object positioned thereon during cooling; and
   a retainer for vertically retaining the bearing supports within the U-shaped cut-out notches formed in the longitudinal members.

14. The roller insert assembly of claim 13, wherein the bearing support has an outboard end which extends beyond an outside surface of the longitudinal member opposite the roller, the outboard end having a recessed radial groove formed thereabout lying in a plane normal to the roller axis, located adjacent the longitudinal member on the outside of the roller insert assembly pocket, the retainer comprising a retention ring sized to partially fit within the groove in the bearing support, and to partially extend beyond the bearing support to engage a recess formed in the outside surface of the longitudinal member, aligned with the U-shaped cut-out notch, creating a step which abuts the retention ring limiting relative vertical movement of the bearing support.

15. The roller insert assembly of claim 13, wherein a recess is formed at the intersection of the top of the longitudinal member and an edge of the U-shaped cut-out notch and a threaded hole is formed in the recess, the retainer further comprising a limiting stop mounted on the recess and overhanging the U-shaped cut-out notch by a threaded fastener cooperating with the threaded hole and the limit stop thereby retaining the bearing support within the U-shaped cut-out notch.

16. The roller insert assembly of claim 15, wherein the limiting stop comprises an annular disc with an inside diameter sized to cooperate with the fastener diameter, and an outside diameter sized to overhang the U-shaped cut-out notch beyond the recess.

17. The roller insert assembly of claim 15, wherein the limiting stop is a bracket with a through hole sized to cooperate with the fastener and a feature to overhang the U-shaped cut-out notch beyond the recess.

18. The roller insert assembly of claim 13, wherein the longitudinal member has a horizontal slot formed longitudinally through both walls of the U-shaped cut-out notch in a region above the bearing support; and the retainer, comprising a bar located in the slot to retain the bearing support in the U-shaped cut-out notch, the bar being hinged at one end for rotation to allow clearance for installation or removal of the bearing support and a fastener cooperating with an end of the bar and the longitudinal member to allow the bar to pivot about the fastener.

19. The roller insert assembly of claim 13, wherein the longitudinal member has a horizontal slot formed longitudinally through both walls of the U-shaped cut-out notch in a region above the bearing support, and the retainer comprises a crossbar located in the slot to retain the bearing support in the U-shaped cut-out notch, having a threaded hole through the center of the crossbar, with a threaded fastener mounted within the threaded hole in the crossbar, having an end extending into a pocket in the top surface of the bearing support, to retain the crossbar in the horizontal slot, without clamping the bearing support against the U-shaped cut-out notch in the longitudinal member.

20. A cooling bed plate comprising:
   a grid plate formed by a plurality of spaced-apart longitudinal members and a plurality of spaced-apart transverse members which collectively define an array of pockets therewith;
   a plurality of rollers each pivotal about a roller axis;
   an axle cooperating with each roller and coaxially aligned with the roller axis, the axle having two end portions located at opposed axial ends of the roller;
   a pair of bearing supports associated with each roller and sized to fit within a pair of transversely aligned cut-out notches formed in a pair of spaced-apart longitudinal members of the grid plate; and
   a pair of bearings associated with each roller, each mounted within one of the pair of bearing supports for pivotally engaging the axle end portions to orient an upper portion of the roller at a select height above the cooling bed plate to provide rolling support to a heated planar object positioned thereon during cooling.

21. The cooling bed plate of claim 20, wherein the bearings are made of graphite.

22. The cooling bed plate of claim 20, further comprising a retainer for vertically retaining the bearing support within the cut-out notches.

* * * * *